(12) United States Patent
Kim et al.

(10) Patent No.: US 12,680,901 B2
(45) Date of Patent: Jul. 14, 2026

(54) LEAK DETECTION METHOD

(71) Applicant: HanJungNCS.CO., LTD,
Yeongcheon-si (KR)

(72) Inventors: Hwan Sik Kim, Yeongcheon-si (KR);
Hwan Seob Kim, Daegu (KR); **Hyung
Kyun Shin, Gyeongsan-si (KR); Pill
Soo Kang, Daegu (KR); Young Wook
Cho**, Daegu (KR)

(73) Assignee: HanJungNCS.CO., LTD,
Yeongcheon-si (KR)

( * ) Notice: Subject to any disclaimer, the term of this
patent is extended or adjusted under 35
U.S.C. 154(b) by 376 days.

(21) Appl. No.: 18/516,975

(22) Filed: Nov. 22, 2023

(65) Prior Publication Data

US 2025/0020533 A1      Jan. 16, 2025

(30) Foreign Application Priority Data

Jul. 10, 2023      (KR) ........................ 10-2023-0088985

(51) Int. Cl.
G01M 3/02        (2006.01)
G01M 3/04        (2006.01)
G01M 3/26        (2006.01)
G01M 3/32        (2006.01)

(52) U.S. Cl.
CPC ............ G01M 3/02 (2013.01); G01M 3/3245
(2013.01); G01M 3/04 (2013.01); G01M 3/26
(2013.01)

(58) Field of Classification Search
CPC ........ G01M 3/02; G01M 3/3245; G01M 3/04;
G01M 3/26
See application file for complete search history.

(56) References Cited

U.S. PATENT DOCUMENTS

| | | | | |
|---|---|---|---|---|
| 10,996,134 | B2 * | 5/2021 | Duan | ........................ F01P 11/18 |
| 11,079,300 | B2 * | 8/2021 | Shi | ........................ G01M 3/2815 |
| 11,614,249 | B2 * | 3/2023 | Chen | ..................... G06F 17/145 |
| | | | | 706/27 |
| 12,067,333 | B2 * | 8/2024 | Zhang | ................... F25B 49/022 |

(Continued)

FOREIGN PATENT DOCUMENTS

| | | | | | |
|---|---|---|---|---|---|
| CN | 110542520 | A | * | 12/2019 | ........... G01M 15/00 |
| CN | 109211494 | B | * | 5/2020 | ............. G01M 3/26 |

(Continued)

*Primary Examiner* — Jonathan M Dunlap
(74) *Attorney, Agent, or Firm* — PnK IP LLC

(57)        ABSTRACT

Proposed is a leak detection method including a mode
determination step of determining, by a mode determination
part, an operating mode of a cooling system on the basis of
information received from the cooling system, a reference
level determination step of determining, by a reference level
determination part, a reference level in a cooling water
storage tank in the operating mode determined in the mode
determination step, a leak determination step of determining,
by a leak determination part, whether a leak has occurred by
comparing the reference level determined in the reference
level determination step and a cooling water level in the
cooling water storage tank measured in real time, and a
notification step of providing, by a leak notification part,
leak information to a set terminal when it is determined that
the leak has occurred in the leak determination step.

6 Claims, 6 Drawing Sheets

(56) References Cited

U.S. PATENT DOCUMENTS

| | | | | |
|---|---|---|---|---|
| 2008/0060374 A1* | 3/2008 | Gammons | ................. | F25D 3/08 |
| | | | | 607/104 |
| 2011/0112814 A1* | 5/2011 | Clark | ................. | G01M 3/3227 |
| | | | | 73/40 |
| 2019/0323917 A1* | 10/2019 | Shi | ........................ | F25B 13/00 |
| 2020/0208861 A1* | 7/2020 | Chen | ....................... | F24F 11/58 |
| 2020/0378863 A1* | 12/2020 | Duan | ....................... | F01P 11/18 |
| 2023/0014287 A1* | 1/2023 | Zhang | .................... | F25B 45/00 |
| 2024/0133603 A1* | 4/2024 | Shi | ........................ | F25B 49/02 |

FOREIGN PATENT DOCUMENTS

| | | | | | |
|---|---|---|---|---|---|
| CN | 113740002 A | * | 12/2021 | ........... | G01R 31/382 |
| EP | 2995869 A1 | * | 3/2016 | ......... | H05K 7/20381 |
| GB | 2260816 A | * | 4/1993 | ........... | F25B 49/005 |
| JP | 2017-133817 | | 8/2017 | | |
| JP | 2017-213250 | | 12/2017 | | |
| KR | 10-2021-0128597 | | 10/2021 | | |
| KR | 10-2324254 | | 11/2021 | | |
| WO | 2015198489 | | 12/2015 | | |

* cited by examiner

LEAK DETECTION METHOD

CROSS REFERENCE TO RELATED APPLICATION

This application claims priority from and the benefit of Korean Patent Application No. 10-2023-0088985, filed on Jul. 10, 2023, which is hereby incorporated by reference for all purposes as if fully set forth herein.

BACKGROUND

Field

The present disclosure relates to a leak detection method for detecting a leak in a cooling system used in an energy storage system (ESS).

Discussion of the Background

An energy storage system is a technology for storing electrical energy to use the electrical energy later when needed, thus improving the safety of power supply.

The energy storage system uses multiple battery modules for storing power, and the energy storage capacity and safety of the battery modules are variable depending on ambient temperature. Therefore, the temperature is controlled through a cooling system in order to improve the performance of the energy storage system.

The cooling system uses a method of circulating fluid, such as cooling water, for temperature control. When cooling water leaks, a fire may occur due to dielectric breakdown caused by the leaked cooling water, so it is crucial to quickly detect the interruption of cooling water and deal with this.

In the related art, leak detection is performed by detecting a pressure change in cooling water flowing through a pipe. However, the above-described cooling system operates at low pressure, so it is practically difficult to detect a minor leak through pressure change.

Accordingly, there is a growing need to develop a new leak detection method for more precisely detecting a leak occurring in the cooling system and supporting dealing with the leak quickly.

The above information disclosed in this Background section is only for understanding of the background of the inventive concepts, and, therefore, it may contain information that does not constitute prior art.

SUMMARY

The present disclosure is directed to providing a leak detection method capable of quickly recognizing a leak occurring in a cooling system to prevent accidents that may occur due to the leak.

Additional features of the inventive concepts will be set forth in the description which follows, and in part will be apparent from the description, or may be learned by practice of the inventive concepts.

According to one aspect of the invention, a leak detection method includes the steps of: determining, by a mode determination part in a mode determination step, an operating mode of a cooling system on the basis of information received from the cooling system; determining, by a reference level determination part in a reference level determination step, a reference level in a cooling water storage tank in the operating mode determined in the mode determination step; determining, by a leak determination part in a leak determination step, whether a leak has occurred by comparing the reference level determined in the reference level determination step and a cooling water level in the cooling water storage tank measured in real time; and providing, by a leak notification part 500 in a notification step, leak information to a set terminal when it is determined that the leak has occurred in the leak determination step.

In the mode determination step, the operating mode may be determined using control information received from a control device of the cooling system or a flow rate change in cooling water circulating in the cooling system.

The reference level determination step may include the steps of: determining, in a mode change determination step, whether the operating mode of the cooling system is changed; maintaining, in a first reference level determination step when it is determined that the operating mode remains constant in the mode change determination step, the reference level at a currently set reference level; or maintaining, in a second reference level determination step when it is determined the operating mode is changed in the mode change determination step, a level stabilization mode for a set period of time, and collecting cooling water level information of the cooling water storage tank for a set period of time when the level stabilization mode ends, and determining an average value of cooling water levels collected for the set period of time as the reference level.

The leak determination step may include the steps of: calculating, in a difference value calculation step, a difference value between the cooling water level in the cooling water storage tank measured in real time and the reference level determined in the reference level determination step; calculating, in a change rate calculation step, a cooling water level change rate of the cooling water storage tank measured in real time; and determining that the leak has occurred when the difference value between the cooling water level and the reference level calculated in the difference value calculation step is equal to or greater than a set value or when the cooling water level change rate calculated in the change rate calculation step is equal to or greater than a set value, or entering the mode determination step when it is determined that there is no leak, in a calculated value-based determination step.

The difference value calculation step may include the steps of: measuring, in a cooling water level measurement step, the cooling water level in the cooling water storage tank in real time; measuring, in a cooling water temperature measurement step, a temperature of cooling water in the cooling system in real time; correcting, in a corrected level calculation step, the level measured in the cooling water level measurement step on the basis of the temperature measured in the cooling water temperature measurement step to calculating a corrected cooling water level; and calculating, in a corrected difference value calculation step, a difference value between the corrected cooling water level calculated in the corrected level calculation step and the reference level determined in the reference level determination step.

In the corrected level calculation step S313, the corrected cooling water level may be calculated using Equation 1, wherein $$h1 = h0 - C \times (t1 - t0) \qquad \text{Equation 1)}$$

(h0: the reference level, h1:: the level to which correction based on a cooling water temperature change is applied, t0: a reference temperature (the temperature when the reference level is measured), t1: a current temperature, C: a correction coefficient)

The leak detection method may use a leak detection device, and the leak detection device may include: a level measurement means coupled to the cooling water storage tank in which cooling water is stored, and configured to measure the cooling water level in the cooling water storage tank; and a controller configured to receive cooling water level information from the level measurement means, and including the mode determination part, the reference level determination part, and the leak determination part.

The leak detection device may further include a cooling water flow limiting means positioned facing a cooling water inlet part, inside the cooling water storage tank.

The cooling water flow limiting means may include: a limiting means housing of which the front side facing the cooling water inlet part is open, wherein cooling water outlets are formed in the top and the bottom of the limiting means housing; and a flow weakening protrusion formed at an inner surface of the limiting means housing.

In addition, an intermediate depository tank 600 coupled to the top of the cooling water storage tank 11 may be further included, wherein the cooling water that has circulated through the cooling system 10 flows into the intermediate depository tank 600. A first cooling water inlet opening 610 and a second cooling water inlet opening 11-1 may be formed in the lower edge of the intermediate depository tank 600 and the upper edge of the cooling water storage tank 11 facing the lower edge of the intermediate depository tank 600, respectively.

In addition, a spiral cooling water falling path formation means coupled to an inner surface of the cooling water storage tank 11 may be further included.

The leak detection method according to the present disclosure detects a leak using a change in the cooling water level in the cooling water storage tank, thus having a great leak detection capacity compared to the related art in which a leak is detected using pressure.

In addition, detected leak information can be provided to a manager, thus quickly dealing with leak situations.

In addition, an average value of levels recognized for a predetermined period of time is determined as the reference level, so the determined reference level is highly reliable.

In addition, as a reference level is reset each time the operating mode of the cooling water system changes, level errors occurring because of mode changes can be effectively dealt with.

In addition, a level change caused by temperature change is compensated for and is used in determining whether a leak has occurred, thereby more accurately determining whether a leak has occurred.

In addition, the flow of the cooling water contained in the tank due to the cooling water flowing in through the cooling water flow limiting means can be minimized, thus achieving more accurate level measurement.

In addition, the cooling water is recovered by directing the cooling water to flow to the edge of the cooling water storage tank, thus minimizing the flow of the cooling water contained in the tank due to the recovered cooling water.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts

DETAILED DESCRIPTION

Figure 1:
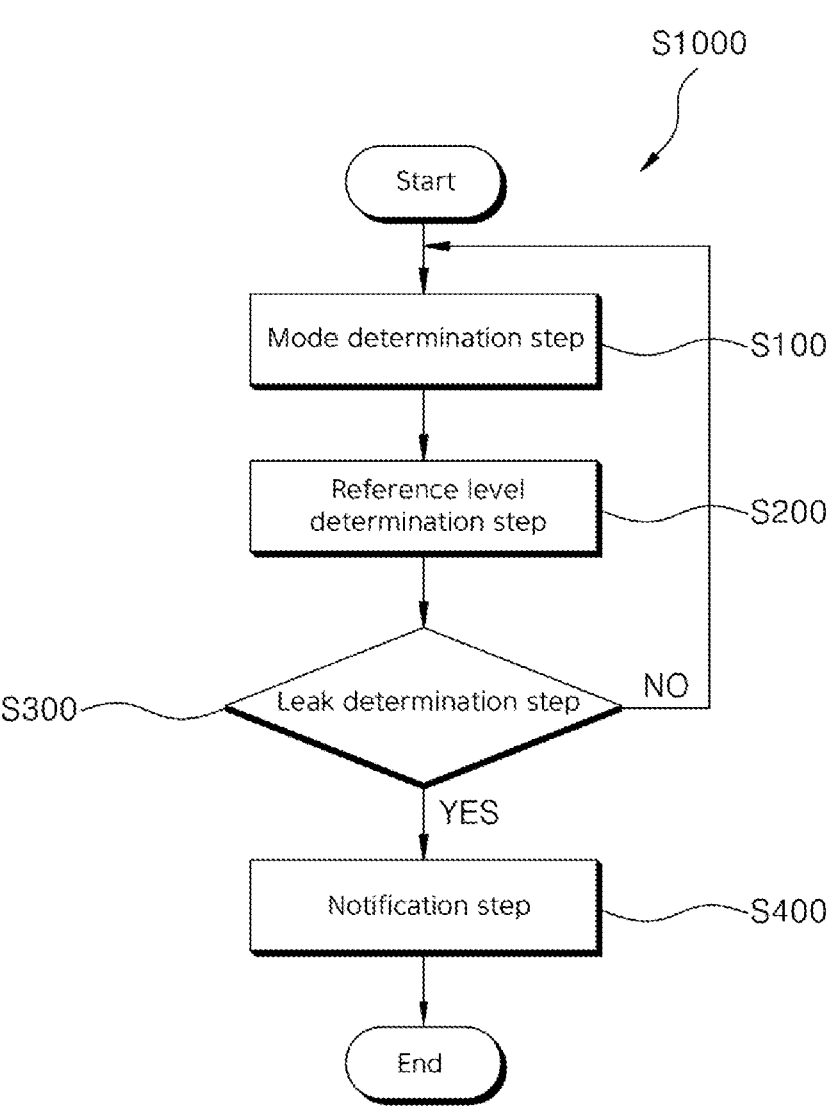
FIG. 1 is a flowchart illustrating a leak detection method according to the present disclosure.

Advantages and features of embodiments of the present disclosure, and methods to achieve the same will be apparent from the following embodiments that will be described in detail with reference to the accompanying drawings. However, the present disclosure may be embodied in many different forms, and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the description, the same reference numerals refer to same elements.

In the following description, when it is determined that a detailed description of a known function or element related with the present disclosure makes the gist of the present disclosure unclear, the detailed description will be omitted. Further, the terms described below defined considering functions in the embodiments of the present disclosure may be variable depending on the intention of the user, the operator, or the custom. Therefore, the definitions should be based on the contents throughout this specification.

Hereinafter, a leak detection method S1000 according to the present disclosure will be described with reference to the accompanying drawings.

Figure 2:
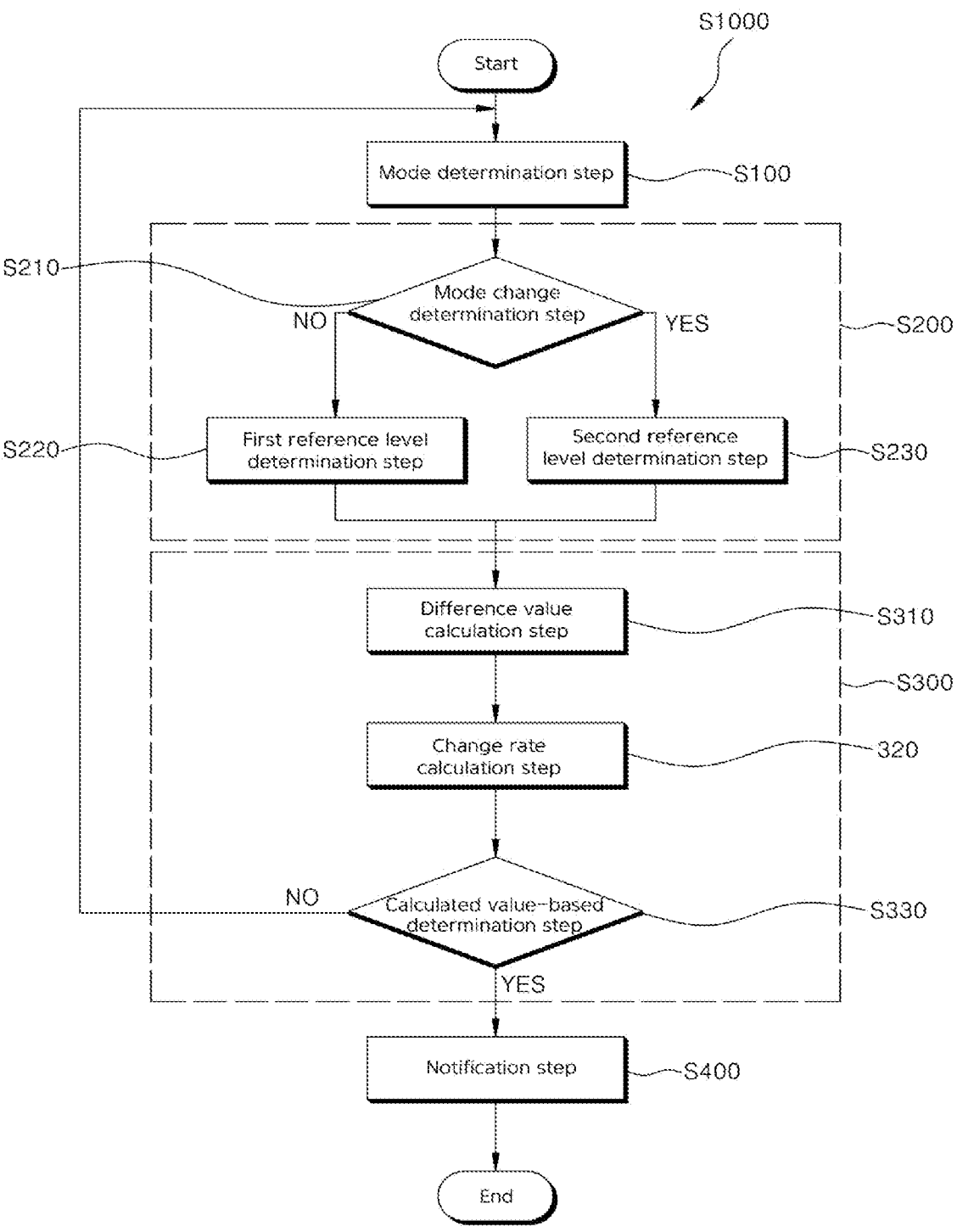
FIG. 2 is a detailed flowchart illustrating a reference level determination step and a leak determination step of the leak detection method according to the present disclosure.
Figure 3:
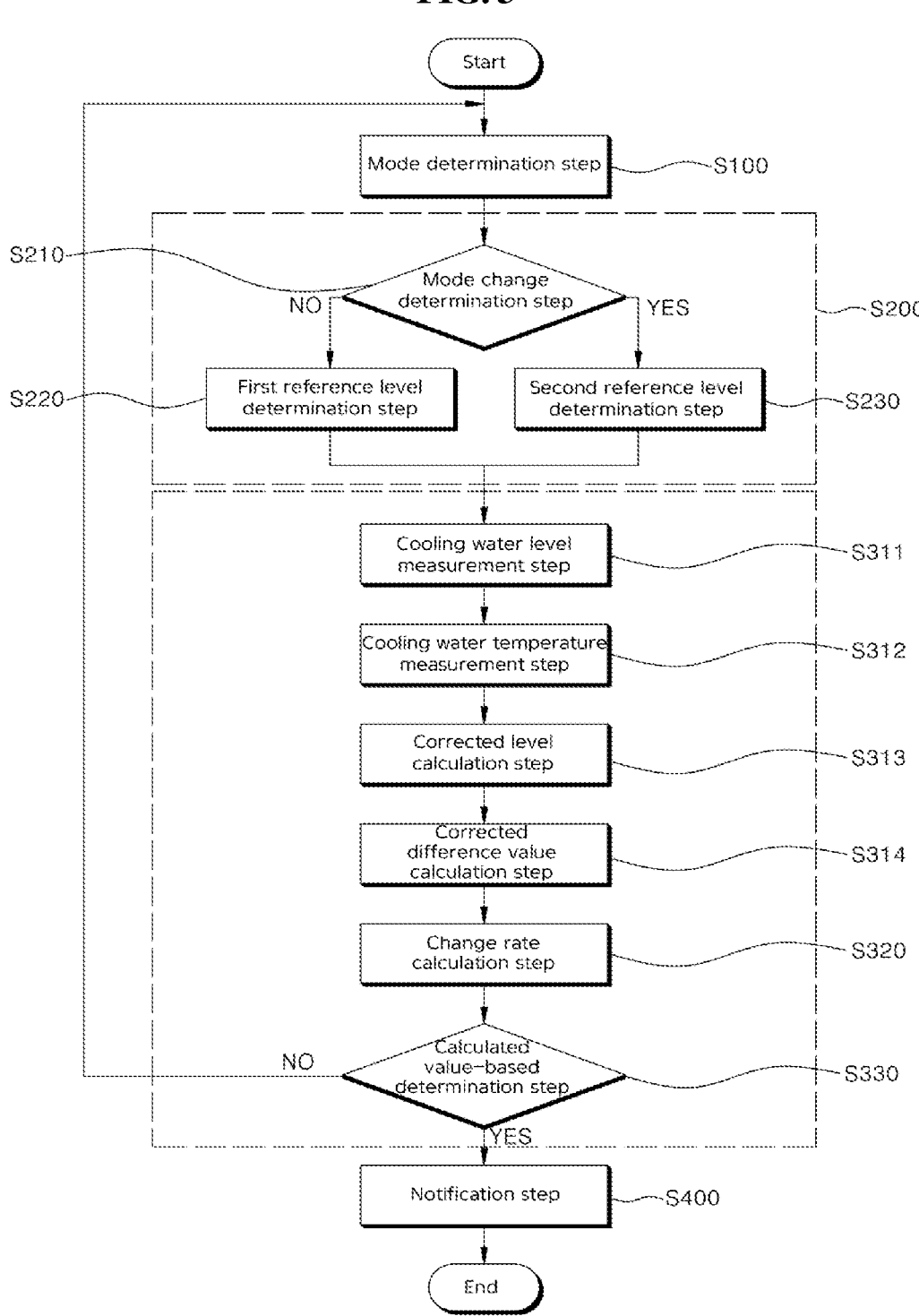
FIG. 3 is a detailed flowchart illustrating a difference value calculation step of the leak detection method according to the present disclosure.
Figure 4:
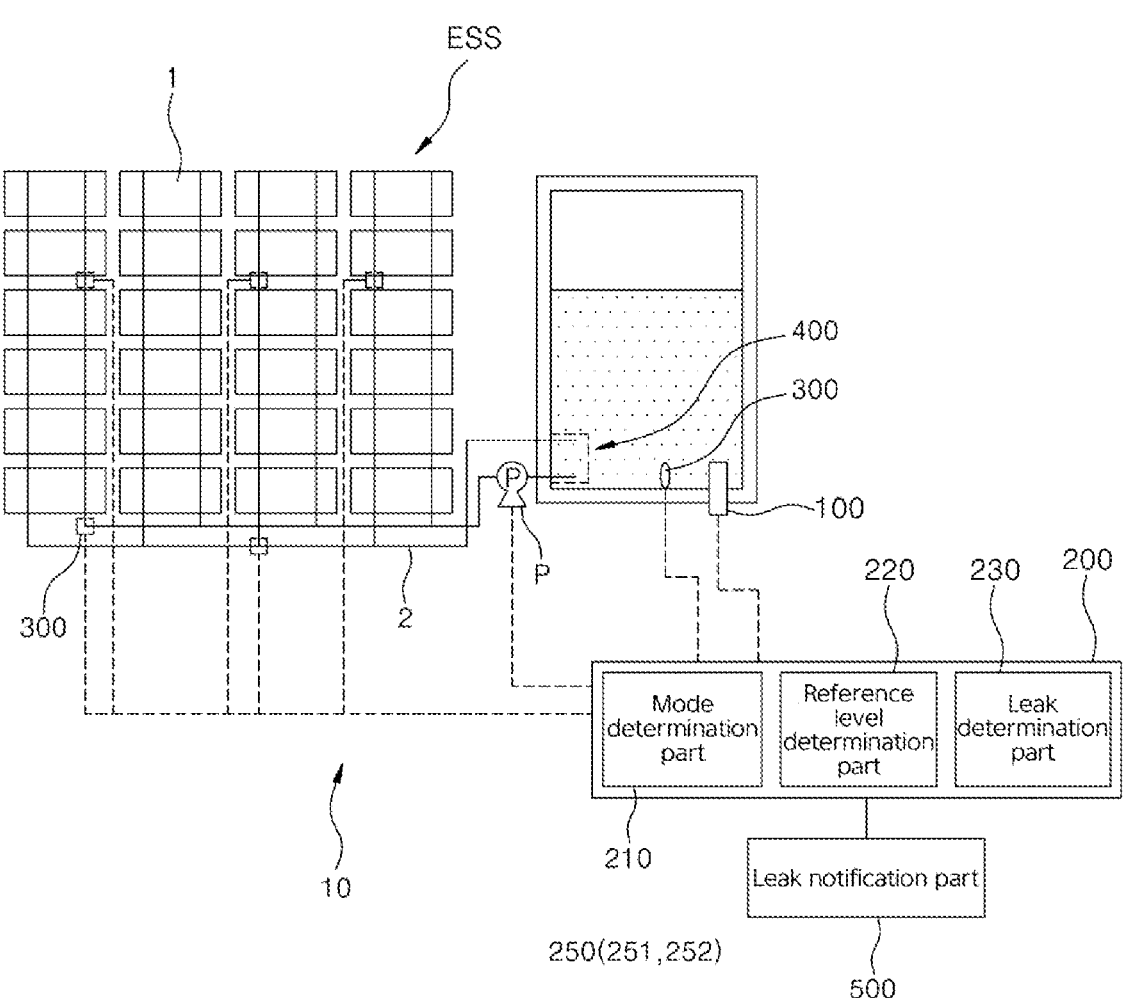
FIG. 4 is a conceptual diagram illustrating a leak detection device used in the leak detection method according to the present disclosure.
Figure 5:
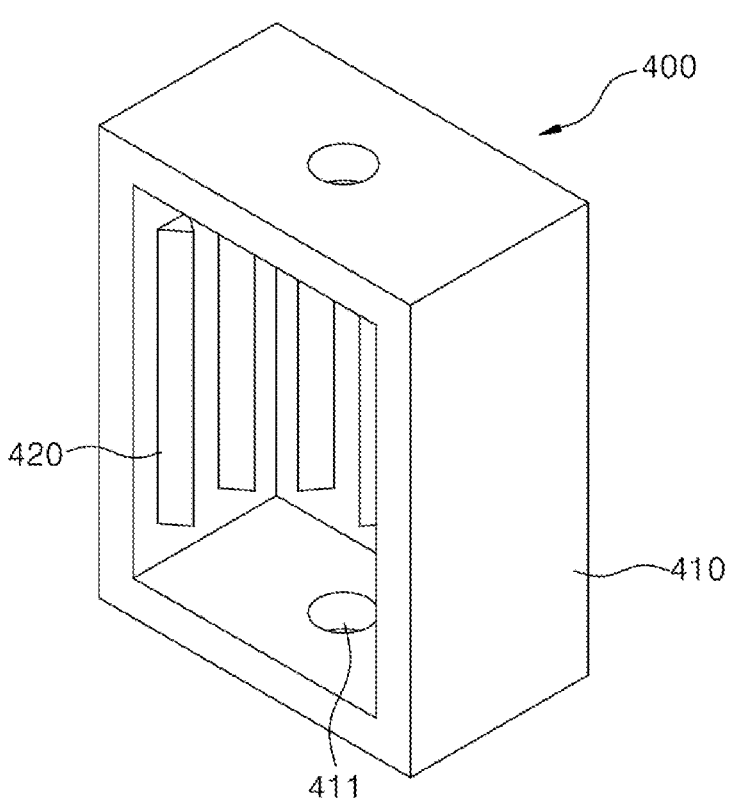
FIG. 5 is a perspective view illustrating a cooling water flow limiting means of the leak detection device.
Figure 6:
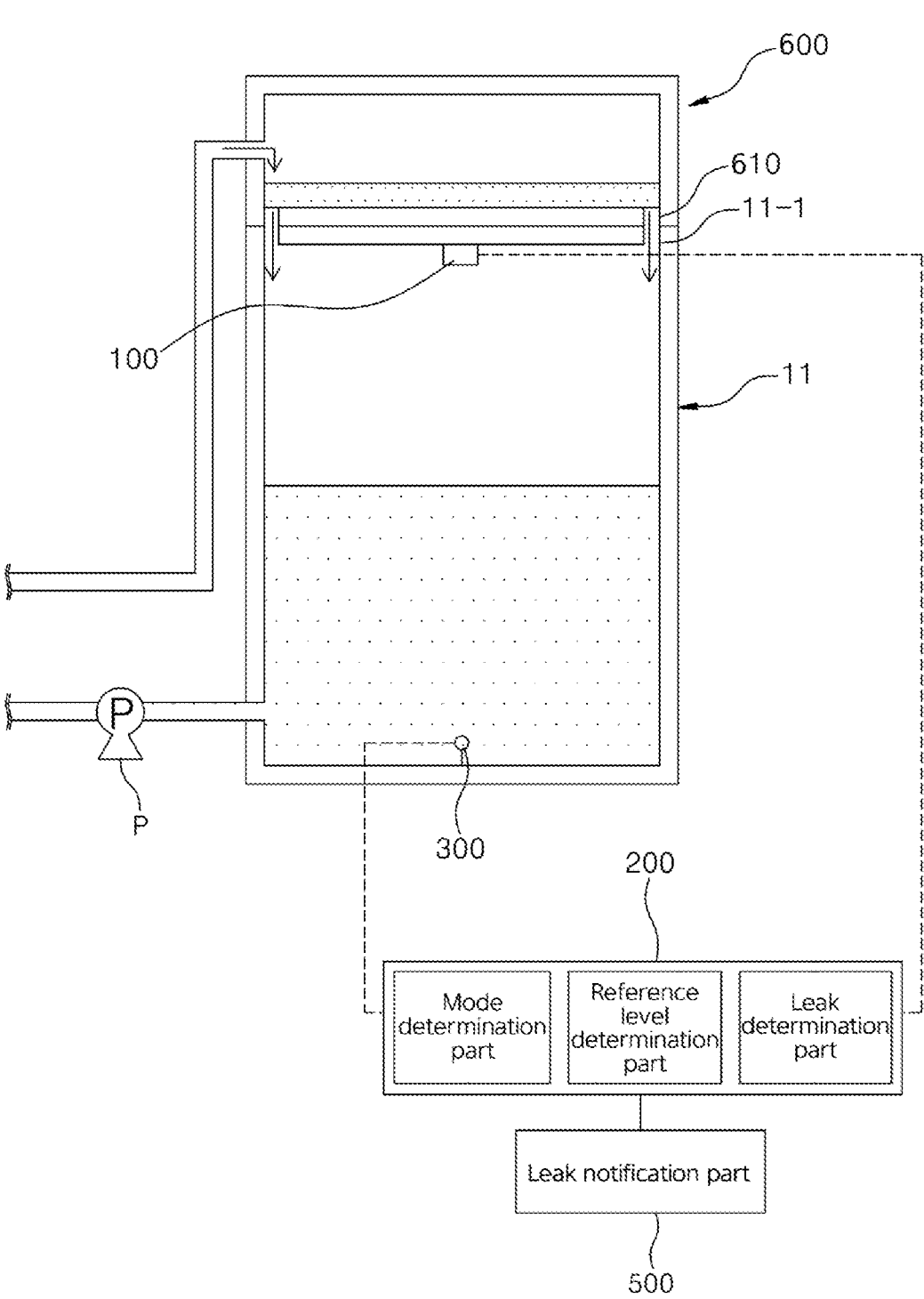
FIG. 6 is a conceptual diagram illustrating an intermediate depository tank coupled to the leak detection device.

FIG. 1 is a flowchart illustrating a leak detection method according to the present disclosure. FIG. 2 is a detailed flowchart illustrating a reference level determination step and a leak determination step of the leak detection method according to the present disclosure. FIG. 3 is a detailed flowchart illustrating a difference value calculation step of the leak detection method according to the present disclosure. FIG. 4 is a conceptual diagram illustrating a leak detection device used in the leak detection method according to the present disclosure. FIG. 5 is a perspective view illustrating a cooling water flow limiting means of the leak detection device. FIG. 6 is a conceptual diagram illustrating an intermediate depository tank coupled to the leak detection device.

Referring to FIGS. 1 to 4, the leak detection method S1000 according to the present disclosure may include: determining, by a mode determination part in a mode determination step S100, an operating mode of a battery cooling system 10 on the basis of information received from the battery cooling system 10; determining, by a reference level determination part in a reference level determination step S200, a reference level in a cooling water storage tank 11 in the operating mode determined in the mode determination step S100; determining, by a leak determination part in a leak determination step S300, whether a leak has occurred by comparing the reference level determined in the reference level determination step S200 and a cooling water level in the cooling water storage tank 11 measured in real time; and providing, by a leak notification part 500 in a notification step S400, leak information to a set terminal when it is determined that the leak has occurred in the leak determination step S300.

Specifically describing, the energy storage system ESS uses multiple battery modules 1 as shown in FIG. 4 and the performance of the battery modules 1 is affected by ambient temperature, so the temperature of the space in which the battery modules 1 are positioned is maintained at a set value through the cooling system 10.

Herein, when there is a leak in a pipe 2 through which cooling water flows, a fire may occur due to dielectric breakdown caused by the leaked cooling water. Therefore, the occurrence of a leak should be quickly detected and dealt with.

In the related art, to solve this problem, a method of determining a leak on the basis of a pressure change in cooling water flowing through a pipe 2 is used. However, a battery cooling system operates at low pressure, so it is very difficult to detect a minor leak.

Therefore, according to the present disclosure, in the leak determination step S300, a leak is more precisely and quickly determined by comparing the reference level determined in the reference level determination step S200 and a cooling water level in the cooling water storage tank 11 measured in real time.

In addition, the cooling water level in the cooling water storage tank 11 may be variable depending on the mode of the cooling system 10. Thus, the reference level is measured again each time the mode of the cooling system 10 is changed.

Herein, in the mode determination step S100, the mode may be determined through control information received from a control device of the cooling system 10 or through a pressure change in the pipe 2 of the cooling system 10. More specifically, when mode switch information is received from the control device or a pressure measured in the pipe 2 has a change equal to or greater than a set value, the mode determination part may determine that the operating mode of the cooling system 10 is changed.

Referring to FIG. 2, the reference level determination step S200 may include: determining whether the operating mode of the cooling system 10 is changed in a mode change determination step S210; maintaining, when it is determined that the operating mode remains constant in the mode change determination step S210, the reference level at a currently set reference level in a first reference level determination step S220; or maintaining, when it is determined that the operating mode is changed in the mode change determination step S210, a level stabilization mode for a set period of time, and collecting cooling water level information of the cooling water storage tank 11 for a set period of time when the level stabilization mode ends, and determining an average value of cooling water levels collected for the set period of time as the reference level in a second reference level determination step S230.

Specifically describing, when the mode of the cooling system 10 is changed, the level in the cooling water storage tank 11 may be variable for a predetermined period of time. Therefore, when the mode remains constant, a reference level is determined in the first reference level determination step S220. When it is determined that the mode is changed, a reference level is determined in the second reference level determination step S230 including entering the level stabilization mode.

Describing this again, when the operating mode of the cooling system 10, the amount of cooling water supplied through the pipe 2 by a pump P is variable. Therefore, when the operating mode is changed, the cooling water level in the cooling water storage tank 11 is stabilized after a circulation cycle, in which the supplied cooling water is recovered, is completed. Before the circulation cycle is completed, the cooling water level of the cooling water storage tank 11 changes gradually.

Therefore, when it is determined that the operating mode of the cooling system 10 remains constant in the mode change determination step S210, the previously determined reference level is maintained as it is in the first reference level determination step S220. When it is determined that the operating mode of the cooling system 10 is changed in the mode change determination step S210, the level stabilization mode is entered until the fluid supplied in accordance with the changed operating mode is recovered, and afterward, an average value of cooling water levels measured for a set period of time is determined as the reference level, in the second reference level determination step S230.

Herein, the level stabilization mode may mean a waiting mode in which the cooling water level is not measured. The level stabilization mode may be set to the time required to recover the fluid supplied in accordance with the changed operating mode of the cooling system 10 as described above.

In addition, when the previously determined reference level is maintained as it is in the first reference level determination step S220, particular remeasurement of a reference level is not performed and the previously determined reference level is used as it is. An initial reference level may be input by a manager, may be determined through an initial reference level determination step, or may be determined in the second reference level determination step S230.

Referring to FIG. 2, the leak determination step S300 may include: calculating, in a difference value calculation step S310, a difference value between the cooling water level in the cooling water storage tank 11 measured in real time and the reference level determined in the reference level determination step S200; calculating, in a change rate calculation step S320, a cooling water level change rate of the cooling water storage tank 11 measured in real time; and determining that the leak has occurred when the difference value between the cooling water level and the reference level calculated in the difference value calculation step S310 is equal to or greater than a set value or when the cooling water level change rate calculated in the change rate calculation step S320 is equal to or greater than a set value, or entering the mode determination step S100 when it is determined that there is no leak, in a calculated value-based determination step S330.

Specifically describing, when there is a leak, the cooling water level changes. Therefore, the difference value according to the change in the cooling water level is calculated in the difference value calculation step S310, and the cooling water level change rate is calculated in the change rate calculation step S320. Then, when it is confirmed that there is a change in the cooling water level because the calculated difference value or the calculated change rate is equal to or greater than the set value, it is determined that there is a leak in the calculated value-based determination step S330 and the notification step S400 is performed.

In addition, when it is determined that there is no leak, the mode determination step S100 is performed again so that leak determination is continuously performed.

Referring to FIGS. 3 and 4, the difference value calculation step S310 may include: measuring, in a cooling water level measurement step S311, the cooling water level in the cooling water storage tank 11 in real time; measuring, in a cooling water temperature measurement step S312, a temperature of cooling water in the cooling system 10 in real time; correcting, in a corrected level calculation step S313, the level measured in the cooling water level measurement step S311 on the basis of the temperature measured in the cooling water temperature measurement step S312 to calculating a corrected cooling water level; and calculating, in a corrected difference value calculation step S314, a difference value between the corrected cooling water level calculated in the corrected level calculation step S313 and the reference level determined in the reference level determination step S200.

Specifically describing, when the cooling water in the pipe 2 heated during a heat exchange process flows into the cooling water storage tank 11, the cooling water level (the level distorted because of the temperature) increases and has a large difference from the reference level. Therefore, the cooling water level (the level distorted because of the temperature) is corrected on the basis of the temperature to calculate a corrected level, and the level (corrected level) to which correction is applied is used to determine whether there is a leak.

Herein, the measurement of the cooling water level in the level measurement step S311 may be performed by a level measurement means 100 provided at the cooling water storage tank 11 as shown in FIG. 4. The measurement of the temperature in the temperature measurement step S312 may be performed by a temperature measurement means 300 provided at the cooling water storage tank 11 or the pipe 2.

In addition, the calculation of the corrected cooling water level in the corrected level calculation step S313 may be performed according to Equation 1 below. The corrected cooling water level may be used to calculate a difference value in the corrected difference value calculation step S314.

$$h1 = h0 - C \times (t1 - t0) \qquad \text{Equation 1}$$

(h0: the reference level, h1:: the level to which correction based on a cooling water temperature change is applied, t0: a reference temperature (the temperature when the reference level is measured), t1: a current temperature, C: a correction coefficient)

In addition, the reference temperature may be an average value of temperatures measured at the point in time when the cooling water level used to determine the reference level is measured. The measurement of the temperature may be performed at any one position specified by a user. However, as shown in the drawing, a plurality of temperature measurement means 300 measure temperatures, an average value of the temperatures measured by the plurality of temperature measurement means 300 may be used as a measured temperature value.

Referring to FIGS. 4 and 5, according to the present disclosure, a leak detection device 1000 used in the leak detection method S1000 may be further included. The leak detection device 1000 may include a level measurement means 100 and a controller 200. The level measurement means 100 is coupled to the cooling water storage tank 11, in which cooling water is stored, and measures a cooling water level in the cooling water storage tank 11. The controller 200 receives cooling water level information from the level measurement means 100, and may include a mode determination part 210, a reference level determination part 220, and a leak determination part 230.

In addition, the leak detection device 1000 may further include a cooling water flow limiting means 400 positioned facing a cooling water inlet part, inside the cooling water storage tank 11.

Specifically describing, when the flow of the cooling water positioned in the storage tank 11 increases because of the fluid flowing through the pump P, the level measurement by the level measurement means 100 may not be accurately performed. Therefore, the flow limiting means 400 is used to reduce the flowability (flow velocity) of cooling water flowing into the storage tank 11.

Herein, the cooling water flow limiting means 400 may be a porous structure. However, as shown in FIG. 5, the cooling water flow limiting means 400 may be a device with a box-shaped structure. The cooling water flow limiting means 400 includes a limiting means housing 410 of which the front side facing the cooling water inlet part is open, and flow weakening protrusions 420. In the top and the bottom of the limiting means housing 410, cooling water outlets are formed. The flow weakening protrusions 420 are formed at the inner surface of the limiting means housing 410.

In addition, in the case of the cooling water flow limiting means 400 having the box-shaped structure, it is preferred that each of the flow weakening protrusions 420 has a triangular cross-sectional shape, so flow velocity decreases as the cooling water in contact with the flow weakening protrusions 420 flows into the left and right, and after the flow velocity is reduced, the cooling water flows through the cooling water outlets 411.

Furthermore, the cooling water flow limiting means 400 having the box-shaped structure may be tightly coupled to the inner surface of the cooling water storage tank 11 in which a cooling water inlet pipe coupling opening is formed. When a cooling water outlet 411 is formed only in the bottom of the limiting means housing 410, the flowability of cooling water may be more reduced before the cooling water is discharged.

Referring to FIG. 6, in the leak detection method S1000 according to the present disclosure, an intermediate depository tank 600 is further included. The intermediate depository tank 600 is coupled to the top of the cooling water storage tank 11, and the cooling water that has circulated through the cooling system 10 flows into the intermediate depository tank 600. A first cooling water inlet opening 610 may be formed in the lower edge of the intermediate depository tank 600. A second cooling water inlet opening 11-1 may be formed in the upper edge of the cooling water storage tank 11 facing the lower edge of the intermediate depository tank 600.

Specifically describing, the cooling water that has circulated through the cooling system 10 flows in, resulting in the flow in the cooling water storage tank 11. Therefore, the intermediate depository tank 600 through which the recovered cooling water passes is formed on the top of the cooling water storage tank 11. The first cooling water inlet opening 610 and the second cooling water inlet opening 11-1 through which cooling water flows are formed in the lower edge of the intermediate depository tank 600 and the top of the cooling water storage tank 11, respectively. Accordingly, the cooling water flowing into the intermediate depository tank 600 passes through the first cooling water inlet opening 610 and the second cooling water inlet opening 11-1 and then flows into the cooling water storage tank 11, flowing down along the inner wall of the cooling water storage tank 11.

In addition, since there may be cooling water that falls instead of flowing along the inner wall of the cooling water storage tank 11, a spiral cooling water falling path formation means is coupled to the inner surface of the cooling water storage tank 11 to make the cooling water flow down along the cooling water falling path formation means.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A leak detection method, comprising the steps of:

determining, in a mode determination step (S100), an operating mode of a cooling system (10) on the basis of information received from the cooling system (10);

determining, in a reference level determination step (S200), a reference level in a cooling water storage tank (11) in the operating mode determined in the mode determination step (S100);

wherein the reference level determination step (S200) comprises the steps of:

maintaining a level stabilization mode for a set period of time (S230);

collecting cooling water level information of the cooling water storage tank (11) for a set period of time when the level stabilization mode ends; and determining an average value of cooling water levels collected for the set period of time as the reference level, determining, in a leak determination step (S300), whether a leak has occurred by comparing the reference level determined in the reference level determination step (S200) and a cooling water level in the cooling water storage tank (11) measured in real time; and wherein the leak determination step (S300) comprises the step of:

calculating, in a difference value calculation step (S310), a difference value between the cooling water level in the cooling water storage tank (11) measured in real time and the reference level determined in the reference level determination step (S200), wherein the difference value calculation step (S310) comprises the steps of:

measuring, in a cooling water level measurement step (S311), the cooling water level in the cooling water storage tank (11) in real time;

measuring, in a cooling water temperature measurement step (S312), a temperature of cooling water in the cooling system (10) in real time; and correcting, in a corrected level calculation step (S313), the level measured in the cooling water level measurement step (S311) on the basis of the temperature measured in the cooling water temperature measurement step (S312) to calculate a corrected cooling water level, wherein in the corrected level calculation step (S313), the corrected cooling water level is calculated according to Equation 1:

$$h1 = h0 - C \times (t1 - t0)$$

(h0: the reference level, h1: the level to which correction based on a cooling water temperature change is applied, t0: a reference temperature (the temperature when the reference level is measured), t1: a current temperature, C: a correction coefficient), providing, in a notification step (S400), leak information to a set terminal when it is determined that the leak has occurred in the leak determination step (S300), wherein the leak detection method uses a leak detection device (1000), and the leak detection device (1000) comprises:

a level measurement device (100) coupled to the cooling water storage tank (11) in which cooling water is stored, and configured to measure the cooling water level in the cooling water storage tank (11); and a cooling water flow limiting device (400) positioned facing a cooling water inlet, inside the cooling water storage tank (11).

2. The leak detection method of claim 1, wherein in the mode determination step (S100), the operating mode is determined using control information received from a control device of the cooling system 10 or a flow rate change in cooling water circulating in the cooling system 10.

3. The leak detection method of claim 1, wherein the reference level determination step (S200) further comprises the step of:

determining, in a mode change determination step (S210), whether the operating mode of the cooling system (10) is changed;

maintaining, in a first reference level determination step (S220) when it is determined that the operating mode remains constant in the mode change determination step (S210), the reference level at a currently set reference level.

4. The leak detection method of claim 1, wherein the leak determination step (S300) further comprises the steps of:

calculating, in a change rate calculation step (S320), a cooling water level change rate of the cooling water storage tank (11) measured in real time; and determining that the leak has occurred when the difference value between the cooling water level and the reference level calculated in the difference value calculation step (S310) is equal to or greater than a set value or when the cooling water level change rate calculated in the change rate calculation step (S320) is equal to or greater than a set value, or entering the mode determination step (S100) when it is determined that there is no leak, in a calculated value-based determination step (S330).

5. The leak detection method of claim 4, wherein the difference value calculation step (S310) further comprises the steps of:

calculating, in a corrected difference value calculation step (S314), a difference value between the corrected cooling water level calculated in the corrected level calculation step (S313) and the reference level determined in the reference level determination step (S200).

6. The leak detection method of claim 1,

Wherein the leak detection device (1000) further comprises:

a controller (200) configured to receive cooling water level information from the level measurement device (100).

* * * * *